US006970898B2

(12) United States Patent
Steele, Jr.

(10) Patent No.: US 6,970,898 B2
(45) Date of Patent: Nov. 29, 2005

(54) SYSTEM AND METHOD FOR FORCING FLOATING POINT STATUS INFORMATION TO SELECTED VALUES

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 626 days.

(21) Appl. No.: 10/035,583

(22) Filed: Dec. 28, 2001

(65) Prior Publication Data

US 2003/0005012 A1 Jan. 2, 2003

Related U.S. Application Data

(60) Provisional application No. 60/293,173, filed on May 25, 2001.

(51) Int. Cl.[7] ..................................... G06F 7/38
(52) U.S. Cl. ..................................... 708/525
(58) Field of Search ..................... 708/495–499, 708/525

(56) References Cited

U.S. PATENT DOCUMENTS

| | | | | |
|---|---|---|---|---|
| 3,725,649 A | | 4/1973 | Deerfield | |
| 4,777,613 A | | 10/1988 | Shahan et al. | |
| 4,788,655 A | | 11/1988 | Nakayama et al. | |
| 4,991,131 A | | 2/1991 | Yeh et al. | |
| 5,065,352 A | | 11/1991 | Nakano | |
| 5,126,963 A | | 6/1992 | Fukasawa | |
| 5,161,117 A | | 11/1992 | Waggener, Jr. | |
| 5,249,149 A | | 9/1993 | Cocanougher et al. | |
| 5,307,303 A | | 4/1994 | Briggs et al. | |
| 5,347,481 A | | 9/1994 | Williams | 364/748 |
| 5,347,482 A | | 9/1994 | Williams | 364/757 |
| 5,357,237 A | | 10/1994 | Bearden et al. | |
| 5,363,321 A | | 11/1994 | Dao Trong et al. | |
| 5,365,465 A | | 11/1994 | Larson | |
| 5,481,489 A | * | 1/1996 | Yanagida et al. | 708/525 |
| 5,570,310 A | | 10/1996 | Smith | |
| 5,666,301 A | | 9/1997 | Makino | |
| 5,748,516 A | | 5/1998 | Goddard et al. | |
| 5,812,439 A | | 9/1998 | Hansen | |
| 5,862,066 A | | 1/1999 | Rossin et al. | |
| 5,892,697 A | | 4/1999 | Brakefield | |
| 5,931,943 A | | 8/1999 | Orup | |
| 5,953,241 A | * | 9/1999 | Hansen et al. | 708/501 |

(Continued)

OTHER PUBLICATIONS

U.S. Appl. No. 10/320,547, filed Dec. 17, 2002, Steele, Jr.
U.S. Appl. No. 10/320,450, filed Dec. 17, 2002, Steele, Jr.
U.S. Appl. No. 10/028,375, filed Dec. 28, 2001, Steele, Jr.

(Continued)

*Primary Examiner*—D. H. Malzahn
(74) *Attorney, Agent, or Firm*—Finnegan, Henderson, Farabow, Garrett & Dunner, L.L.P.

(57) ABSTRACT

A floating point flag forcing circuit comprising an circuit and a result assembler. The circuit receives a plurality of floating point operands, analyzes the floating point operand, receives one or more control input signals, determines one or more predetermined formats in which the plurality of operands are represented, and generates one or more control signals. The result assembler receives the control signals from the circuit, along with one or more inputs, and assembles a result.

24 Claims, 2 Drawing Sheets

U.S. PATENT DOCUMENTS

| | | | | | |
|---|---|---|---|---|---|
| 5,963,461 | A | | 10/1999 | Gorshtein et al. | |
| 5,978,901 | A | | 11/1999 | Luedtke et al. | |
| 5,995,991 | A | | 11/1999 | Huang et al. | |
| 6,009,511 | A | | 12/1999 | Lynch et al. | 712/222 |
| 6,049,865 | A | | 4/2000 | Smith | |
| 6,105,047 | A | | 8/2000 | Sharangpani et al. | |
| 6,108,772 | A | | 8/2000 | Sharangpani | |
| 6,131,106 | A | | 10/2000 | Steele, Jr. | 708/510 |
| 6,138,135 | A | * | 10/2000 | Karp | 708/496 |
| 6,151,669 | A | | 11/2000 | Huck et al. | |
| 6,189,094 | B1 | | 2/2001 | Hinds et al. | |
| 6,205,460 | B1 | | 3/2001 | Steele, Jr. | |
| 6,219,685 | B1 | | 4/2001 | Story | |
| 6,256,655 | B1 | | 7/2001 | Ezer et al. | |
| 6,360,189 | B1 | | 3/2002 | Hinds et al. | |
| 6,393,555 | B1 | | 5/2002 | Meier et al. | |
| 6,490,607 | B1 | | 12/2002 | Oberman | |
| 6,571,265 | B1 | | 5/2003 | Story | |
| 6,594,681 | B1 | | 7/2003 | Prabhu | |
| 6,629,120 | B1 | | 9/2003 | Walster et al. | |
| 6,658,443 | B1 | | 12/2003 | Walster | |
| 6,658,444 | B1 | | 12/2003 | Walster et al. | |
| 6,697,832 | B1 | | 2/2004 | Kelley et al. | |
| 6,732,134 | B1 | * | 5/2004 | Rosenberg et al. | 708/495 |
| 6,789,098 | B1 | | 9/2004 | Dijkstra | |
| 2002/0194232 | A1 | | 12/2002 | Walster | |
| 2003/0033335 | A1 | | 2/2003 | Walster | |

OTHER PUBLICATIONS

U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett–Packard Co., pp. 1–5.
Title: "Vax Floating Point: A Solid Foundation for Numerical Computation", by Mary Payne & Dileep Bhandarkar Digital Equipment Corp., pp. 1–12.
Title: Lecture Notes on the Status of "IEEE Standard 754 for Binary Floating–Point Arithmetic", by Prof. W. Kahan, May 31, 1996, pp. 1–30.
Title: "Interval Arithmetic Specification" by Dmitri Chiriaev & G. William Walster, Draft revised May 4, 1998, pp. 1–78.
Title: "IEEE Standard for Binary Floating–Point Arithmetic IEEE Standard 754–1985," by Standards Committee of the IEEE Computer Society, The Insitute of Electrical and Electronics Engineers, Inc., copyright 1985, pp. 1–14.
Office Action mailed May 5, 2005 in U.S. Appl. No. 10/035,674.

* cited by examiner

SYSTEM AND METHOD FOR FORCING FLOATING POINT STATUS INFORMATION TO SELECTED VALUES

This application claims the benefit of U.S. Provisional Application 60/293,173, filed May 25, 2001.

Related U.S. patent application Ser. No. 10/035,747, filed Dec. 28, 2001 in the name of Guy L. Steele Jr. and entitled "Floating Point System That Represents Status Flag Information Within a Floating Point Operand," assigned to the assignee of the present application, is hereby incorporated by reference.

FIELD OF THE INVENTION

The invention relates generally to systems and methods for performing floating point operations, and more particularly to systems and methods for forcing floating point status information to selected values.

BACKGROUND OF THE INVENTION

Digital electronic devices, such as digital computers, calculators, and other devices, perform arithmetic calculations on values in integer or "fixed point" format, in fractional or "floating point" format, or both. IEEE Standard 754 (hereinafter "IEEE Std. 754" or "the Standard"), published in 1985 by the Institute of Electrical and Electronic Engineers and adopted by the American National Standards Institute (ANSI), defines several standard formats for expressing values in floating point format and a number of aspects regarding behavior of computation in connection therewith. In accordance with IEEE Std. 754, a representation in floating point format comprises a plurality of binary digits, or "bits," having the structure $se_{msb} \ldots e_{lsb}\, f_{msb} \ldots f_{lsb}$ where bit "s" is a sign bit indicating whether the entire value is positive or negative, bits "$e_{msb} \ldots e_{lsb}$" comprise an exponent field representing the exponent "e" in unsigned binary biased format, and bits "$f_{msb} \ldots f_{lsb}$" comprise a fraction field that represents the fractional portion of "f" in unsigned binary format ("msb" represents "most-significant bit" and "lsb" represents "least-significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits $f_{msb} \ldots f_{lsb}$ comprising the fraction field. If a number is represented such that all of the bits "$e_{msb} \ldots e_{lsb}$" of the exponent field are binary ones (i.e., if the bits represent a binary-encoded value of "255" in the single format or "2047" in the double format) and all of the bits $f_{msb} \ldots f_{lsb}$ of the fraction field are binary zeros, then the value of the number is positive or negative infinity, depending on the value of the sign bit "s." In particular, the value "v" is $v=(-1)^s\infty$, where "∞" represents the value of "infinity." On the other hand, if all of the bits "$e_{msb} \ldots e_{lsb}$" of the exponent field are binary ones and if the bits $f_{msb} \ldots f_{lsb}$ of the fraction field are not all zeros, then the value that is represented is deemed "not a number," abbreviated in the Standard by "NaN."

If a number has an exponent field in which the bits "$e_{msb} \ldots e_{lsb}$" are neither all binary ones nor all binary zeros (i.e., if the bits represent a binary-encoded value between 2 and 254 in the single format or between 1 and 2046 in the double format), the number is said to be in a "normalized" format. For a number in the normalized format, the value represented by the number is $v=(-1)^s 2^{e-bias}(1.|f_{msb} \ldots f_{lsb})$, where "|" represents a concatenation operation. Effectively, in the normalized format, there is an implicit most-significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero" and a fraction field in which the bits $f_{msb} \ldots f_{lsb}$ are not all zero, the number is said to be in a "denormalized" format. For a number in the denormalized format, the value represented by the number is $v=(-1)^s 2^{e-bias+1}(0.|f_{msb} \ldots f_{lsb})$. It will be appreciate that the range of values of numbers that can be expressed in the denormalized format is disjointed from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero" (reference format 30). It will be appreciated that the value "zero" may be positive zero or negative zero, depending on the value of the sign bit.

Generally, floating point units to perform computations whose results conform to IEEE Std. 754 are designed to generate a result in response to a floating point instruction in three steps:

(a) In the first step (an approximation calculation step), approximation to the absolutely accurate mathematical result (assuming that the input operands represent the specific mathematical values as described by IEEE Std. 754) is calculated that is sufficiently precise. This allows the accurate mathematical result to be summarized by a sign bit, an exponent (typically represented using more bits than are used for an exponent in the standard floating point format), and some number "N" of bits of the presumed result fraction, plus a guard bit and a sticky bit. The value of the exponent will be such that the value of the fraction generated in step (a) consists of a "1" before the binary point and a fraction after the binary point. The bits are calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); then let the N most-significant bits of the infinite significand be used as the intermediate result significand, let the next bit of the infinite significand be the guard bit, and let the sticky bit be "0" if and only if all remaining bits of the infinite significand are 0-bits (in other words, the sticky bit is the logical OR of all remaining bits of the infinite fraction after the guard bit).

(b) In the second step (a rounding step), the guard bit, the sticky bit, perhaps the sign bit, and perhaps some of the bits of the presumed significand generated in step (a) are used to decide whether to alter the result of step (a). For the rounding modes defined by IEEE Std. 754, this is a decision as to whether to increase the magnitude of the number represented by the presumed exponent and fraction generated in step (a). Increasing the magnitude of the number is done by adding "1" to the significand in its least-significant bit position, as if the significand were a binary integer. It will be appreciated that, if the significand is all 1-bits, then the magnitude of the number is "increased" by changing it to a high-order 1-bit followed by all 0-bits and adding "1" to the exponent.

Regarding the rounding modes, it will be further appreciated that:

- (i) if the result is a positive number, and
  - (a) if the decision is made to increase, effectively the decision has been made to increase the value of the result, thereby rounding the result up (i.e., towards positive infinity), but
  - (b) if the decision is made not to increase, effectively the decision has been made to decrease the value of the result, thereby rounding the result down (i.e., towards negative infinity); and
- (ii) if the result is a negative number, and
  - (a) if the decision is made to increase, effectively the decision has been made to decrease the value of the result, thereby rounding the result down, but
  - (b) if the decision is made not to increase, effectively the decision has been made to increase the value of the result, thereby rounding the result up.
  - (c) In the third step (a packaging step), the result is packaged into a standard floating point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, it is assumed that this is the step that forces the result to be a NaN if any input operand is a NaN. In this step, the decision is also made as to whether the result should be an infinity. It will be appreciated that, if the result is to be a NaN or infinity, any result from step (b) will be discarded and instead the appropriate representation will be provided as the result.

In addition, in the packaging step, floating point status information is generated, which is stored in a floating point status register. The floating point status information generated for a particular floating point operation includes indications, for example, as to whether (i) a particular operand is invalid for the operation to be performed ("invalid operation");

(ii) if the operation to be performed is division, the divisor is zero ("division-by-zero");

(iii) an overflow occurred during the operation ("overflow");

(iv) an underflow occurred during the operation ("underflow"); and (v) the rounded result of the operation is not exact ("inexact").

These conditions are typically represented by flags that are stored in the floating point status register separate from the result itself. The floating point status information can be used to dynamically control the operations in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a plurality of floating point operations.

IEEE Std. 754 has brought relative harmony and stability to floating point computation and architectural design of floating point units. Moreover, its design was based on some important principles and rests on sensible mathematical semantics that ease the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes (e.g., the rounding mode and traps enabled/disabled mode), flags (e.g., flags representing the status information stored in the floating point status register 25), and traps required to implement IEEE Std. 754 introduce implicit serialization issues. Implicit serialization is essentially the need for serial control of access (read/write) to and from globally used registers, such as the floating point status register 25. Under IEEE Std. 754, implicit serialization may arise between (1) different concurrent floating point instructions and (2) between floating point instructions and the instructions that read and write the flags and modes. Furthermore, rounding modes may introduce implicit serialization because they are typically indicated as a global state, although in some microprocessor architectures, the rounding mode is encoded as part of the instruction operation code, which will alleviate this problem to that extent. Thus, the potential for implicit serialization makes the Standard difficult to implement coherently and efficiently in today's superscalar and parallel processing architectures without loss of performance.

(ii) The implicit side effects of a procedure that can change the flags or modes can make it very difficult for compilers to perform optimizations on floating point code. As a result, compilers for most languages must assume that every procedure call is an optimization barrier in order to be safe.

(iii) Global flags, such as those that signal certain modes, make it more difficult to do instruction scheduling where the best performance is provided by interleaving instructions of unrelated computations. Instructions from regions of code governed by different flag settings or different flag detection requirements cannot easily be interleaved when they must share a single set of global flag bits.

(iv) Furthermore, traps have been difficult to integrate efficiently into architectures and programming language designs for fine-grained control of algorithmic behavior.

In addition to the above drawbacks, even though existing computer architectures eliminate the rounding modes as a global state by statistically encoding the rounding mode as part of the instruction code, existing computer architectures do not eliminate flags and trap enable bits as a global state, while supporting similar exception detection capabilities. Examples of computer architectures that eliminate the rounding modes as a global state are demonstrated by the ALPHA architecture designed by Digital Equipment Corp. (DEC), which partially eliminates the rounding modes, and the MAJC architecture designed by Sun Microsystems, which completely eliminates the rounding modes.

Furthermore, existing systems for conducting arithmetic floating point instructions, in which flag information is stored in a global state, do not provide the capability of having the flag information associated with one arithmetic expression unassociated with the flag information of another arithmetic expression. Thus, they do not allow for the instructions for two unrelated arithmetic expressions to be interleaved in time to improve the efficiency of a compiler optimizer in performing instruction scheduling.

Although undeveloped in the art, whether the information is accumulated in a global state, as in IEEE 754, or in a numerical result, it would be convenient and useful to have means for clearing selected flag information from the operand value, such as its approximate numerical magnitude, its sign, and whether it is a NaN, an infinity, or one of the other aforementioned operand formats.

Thus, there is a need for a system that avoids such problems when performing floating point operations and, in particular, when forcing floating point status information to selected values.

SUMMARY OF THE INVENTION

Methods, systems, and articles of manufacture consistent with the present invention overcome these shortcomings with a floating point status information forcing circuit that forces floating point status information to selected values. In other words, these methods, systems and articles of manufacture selectively clear at least a portion of floating point status flag information within a floating point operand. More particularly stated, one aspect of the present invention provides a method for forcing floating point status information for selectively clearing at least a portion of encoded status flag information within a floating point operand. First, the floating point operand is received and analyzed. The encoded status flag information associated with the floating point operand is analyzed to identify a predetermined format associated with the floating point operand. Next, a control signal is received. The control signal is for selectively clearing the encoded status flag information. Next, an assembly signal is generated, usually based upon the control signal and a rounding mode signal. Finally, the resulting operand is assembled in which at least a portion of the encoded status flag information of the resulting operand is cleared based upon the predetermined format and values of the control signal and the assembly signal.

Additional advantages of the invention will be set forth in part in the description which follows, and in part will be obvious from the description, or may be learned by practicing the invention. The advantages of the invention will be realized and attained by means of the elements and combinations particularly pointed out in the appended claims.

It is to be understood that both the foregoing general description and the following detailed description are exemplary and exemplary only and are not restrictive of the invention, as claimed.

The accompanying drawings, which are incorporated herein and constitute a part of this specification, illustrate embodiments of the invention and together with the description, serve to explain the principles of the invention.

DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Related U.S. patent application Ser. No. 10/035,747, which has previously been incorporated by reference, describes an exemplary floating point unit in which floating point status information is encoded in the representations of the results generate thereby. The exemplary floating point unit includes a plurality of functional units, including an adder unit, a multiplier unit, a divider unit, a square root unit, a maximum/minimum unit, a comparator unit, and a unit for forcing floating point status information to selected values, all of which operate under control of functional unit control signals provided by a control unit. The present application is directed to an exemplary unit for forcing floating point status information to selected values that can be used as another functional unit or as part of the aforementioned units in the floating point unit described in related U.S. patent application Ser. No. 10/035,747.

Figure 1:
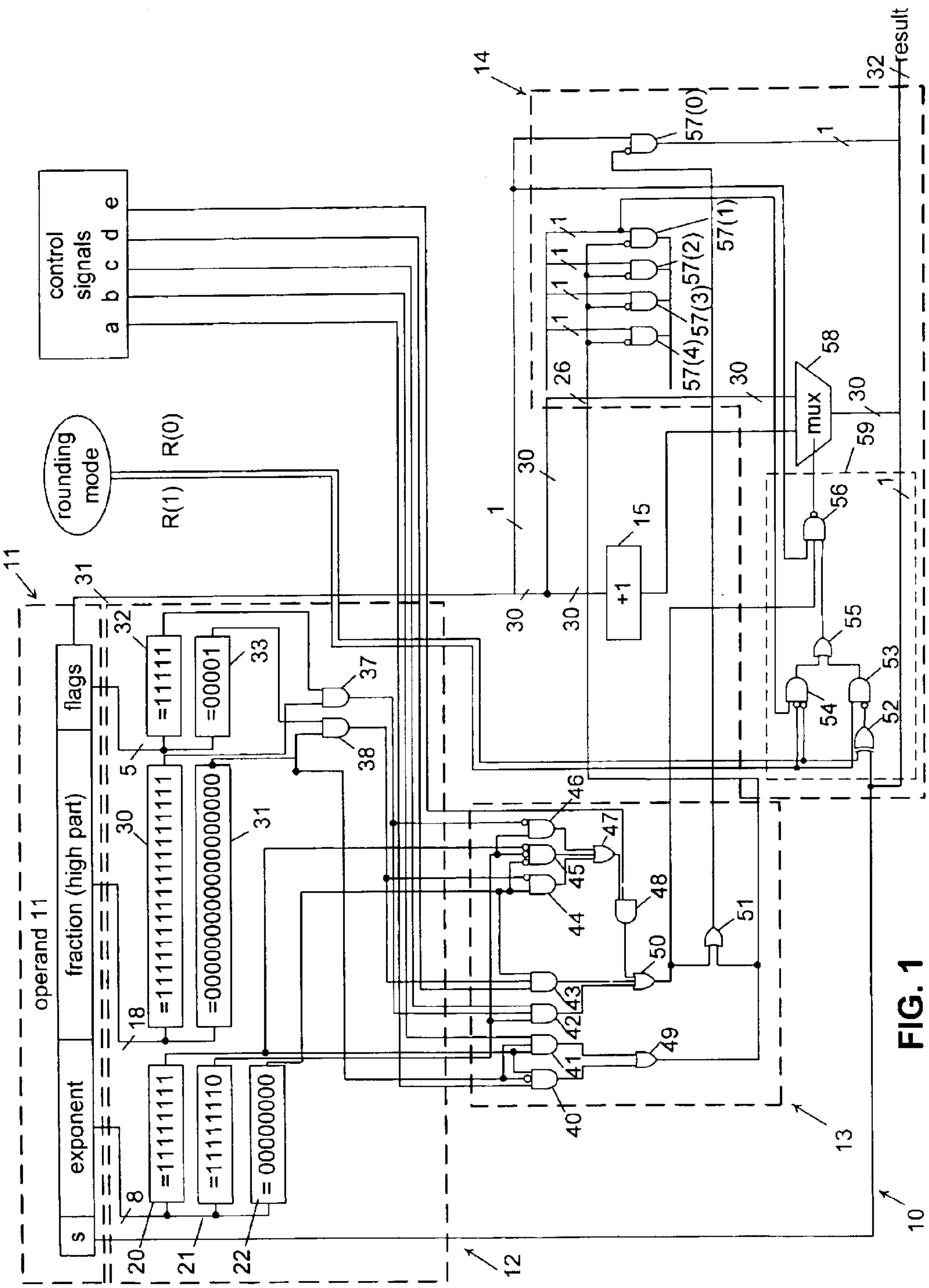
FIG. 1 is a functional block diagram of an exemplary circuit for forcing floating point status information to selected values constructed, consistent with an exemplary embodiment of the present invention.

FIG. 1 is a functional block diagram of an exemplary floating point status information forcing circuit 10 constructed in accordance with an embodiment of the invention. Generally, the floating point status information forcing circuit 10 can receive a floating point operand and generate therefrom a result as will be described below, in which floating point status information is embedded in the operand. Advantageously, the floating point status information forcing circuit 10 embeds the floating point status information by forcing the status information to predetermined values. In other words, the floating point status information may be intentionally and selectively cleared in embodiments of the present invention to avoid unnecessary accumulation of embedded status information within the resulting operand. Those skilled in the art will appreciate that the selective capability to clear or force the embedded status information to a particular value while preserving other characteristics of the resulting operand value is useful and convenient when attempting to efficiently process one or more floating point operands.

Since the floating point status information is part of the floating point representation of the result, instead of being separate and apart from the result, there is no need to access any external circuitry (e.g., a floating point status register). Thus, the implicit serialization that is required by maintaining the floating point status information separate and apart from the result can be advantageously obviated.

Figure 2:
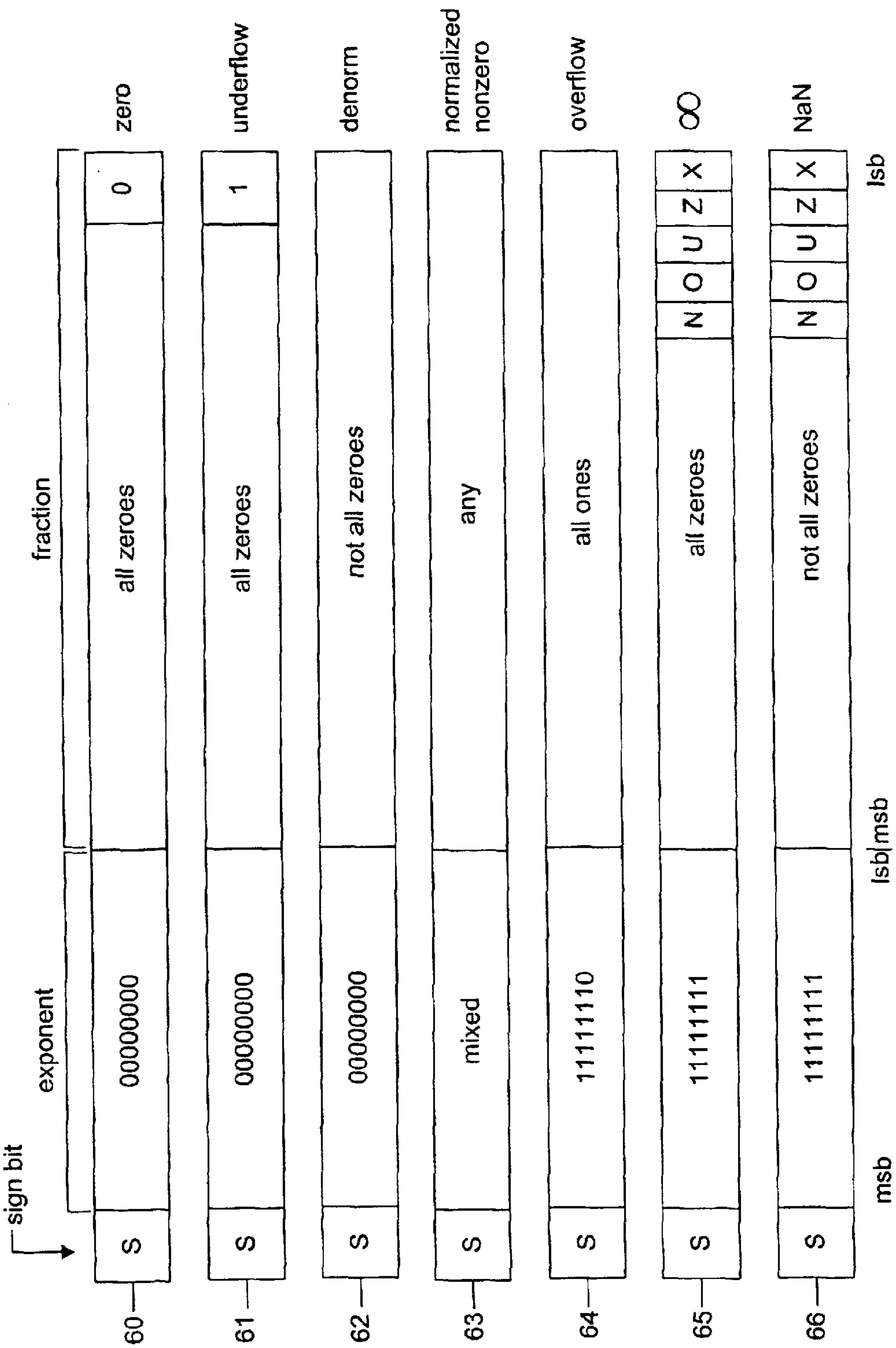
FIG. 2 depicts formats for representations of floating point operands used by the floating point status information forcing circuit depicted in FIG. 1, consistent with an exemplary embodiment of the present invention.

In the illustrated embodiment of FIG. 1, the exemplary floating point status information forcing circuit 10 encodes the floating point status information in results that are generated in a plurality of exemplary formats, which will be illustrated in connection with FIG. 2. FIG. 2 depicts exemplary formats of floating point operands that the floating point status information forcing circuit 10 may receive and of results that it may generate. With reference to FIG. 2, seven exemplary formats are depicted, including a zero format 60, an underflow format 61, a denormalized format 62, a normalized non-zero format 63, an overflow format 64, an infinity format 65, and a not-a-number (NaN) format 66. The zero exemplary format 60 is used to represent the values "zero" or, more specifically, positive or negative zero, depending on the value of "s," the sign bit.

The exemplary underflow format 61 provides a mechanism by which the floating point status information forcing circuit 10 can indicate that the result of a computation is an underflow. In the underflow format, the sign bit "s" indicates whether the result is positive or negative, the bits $e_{msb} \ldots e_{lsb}$ of the exponent field are all binary zeros, and the bits $f_{msb} \ldots f_{lsb+1}$ of the fraction field, except for the least-significant bit, are all binary zeros. The least-significant bit $f_{lsb}$ of the fraction field is a binary one.

The exemplary denormalized format 62 and normalized non-zero format 63 are used to represent finite non-zero floating point values substantially along the lines of that described above in connection with IEEE Std. 754. In both formats 62 and 63, the sign bit "s" indicates whether the result is positive or negative. The bits $e_{msb} \ldots e_{lsb}$ of the exponent field of the denormalized format 62 are all binary zeros. However, the bits $e_{msb} \ldots e_{lsb}$ of the exponent field of the normalized non-zero format 63 are mixed ones and zeros, except that the exponent field of the normalized non-zero format 63 will not have a pattern in which bits $e_{msb} \ldots e_{lsb+1}$ are all binary ones and the least-significant bit $e_{lsb}$ is zero and all of the bits $f_{msb} \ldots f_{lsb}$ of the fraction field are all binary ones. In exemplary denormalized format 62, the bits $f_{msb} \ldots f_{lsb}$ of the fraction field are not all binary zeros.

The exemplary overflow format 64 provides a mechanism by which the floating point status information forcing circuit 10 can indicate that the result of a computation is an overflow. In the exemplary overflow format 64, the sign bit "s" indicates whether the result is positive or negative, the bits $e_{msb} \ldots e_{lsb+1}$ of the exponent field are all binary ones, with the least-significant bit $e_{lsb}$ being zero. The bits $f_{msb} \ldots f_{lsb}$ of the fraction field are all binary ones.

The exemplary infinity format 65 provides a mechanism by which the floating point status information forcing circuit 10 can indicate that the result is infinite. In the exemplary infinity format 65, the sign bit "s" indicates whether the result is positive or negative, the bits $e_{msb} \ldots e_{lsb}$ of the exponent field are all binary ones, and the bits $f_{msb} \ldots f_{lsb+5}$ of the fraction field are all binary zeros. The five least-significant bits $f_{lsb+4} \ldots f_{lsb}$ of the fraction field are flags, which will be described below.

The exemplary NaN (not a number) format 66 provides a mechanism by which the floating point status information forcing circuit 10 can indicate that the result is not a number. In the exemplary NaN format, the sign bit "s" can be any value, the bits $e_{msb} \ldots e_{lsb}$ of the exponent field are all binary ones, and the bits $f_{msb} \ldots f_{lsb+5}$ of the fraction field are not all binary zeros. The five least-significant bits $f_{lsb+4} \ldots f_{lsb}$ of the fraction field are flags, which will be described below.

As noted above, in values represented in the exemplary infinity format 65 and the exemplary NaN format 66, the five low order bits $f_{lsb+4} \ldots f_{lsb}$ of the fraction field are flags. In one embodiment, the formats used with the floating point status information forcing circuit 10, include the five flags that are defined by IEEE Std. 754. These flags include an invalid operation flag "n," an overflow flag "o," an underflow flag "u," a division-by-zero flag "z," and an inexact flag "x." For example, a value in the NaN format 66 in which both the overflow flag "o" and the division-by-zero flag "z" are set indicates that the value represents a result of a computation that involved an overflow (this from the overflow flag "o"), as well as an attempt to divide by zero (this from the division-by zero flag "z").

In one embodiment, the flags may provide the same status information as provided by, for example, information stored in a floating point status register in a prior art floating point unit. In this embodiment, the status information is provided as part of the result and stored therewith in registers in which the result is ultimately stored. Therefore, multiple instructions can be contemporaneously executed, since the floating point status information that may be generated during execution of one instruction, when stored, will not over-write previously-stored floating point status information generated during execution of another instruction.

In another embodiment, values in the other formats can be indicated as being inexact based in part on the least-significant bit $f_{lsb}$ of their fraction fields. In that embodiment, that particular bit operates as an inexact flag. Thus, the value will be indicated as being inexact if the particular bit, such as the bit $f_{lsb}$ has the value "one." Otherwise, those skilled in the art will appreciate that the operand has an exact status.

Before proceeding to a description of the floating point status information forcing circuit 10, it will be convenient to have names for the finite non-zero numbers that are adjacent to +OV (a value in the overflow pattern with the sign bit "s" having the value "zero," indicating a positive value), −OV (a value in the overflow pattern with the sign bit "s" having the value of "one," indicating a negative value), +UN (a value in the underflow pattern with the sign bit "s" having the value "zero," indicated a positive value), and −UN (a value in the underflow pattern with the sign bit "s" having the value "one," indicating a negative value), as follows:

| | |
|---|---|
| 0 00000000 00000000000000000000010 | +TINY |
| 1 00000000 00000000000000000000010 | −TINY |
| 0 11111110 1111111111111111111110 | +HUGE |
| 1 11111110 1111111111111111111110 | −HUGE |

Generally, +OV can be deemed to refer to some (or any) value that is strictly between +HUGE and +∞ and +UN can be deemed to refer to some (or any) value that is strictly between +0 and +TINY. Similarly, −OV can be deemed to refer to some (or any) value that is strictly between −HUGE and −∞ and −UN can be deemed to refer to some (or any) value that is strictly between −0 and −TINY.

In this context, those skilled in the art will appreciate that:

(i) the magnitude, or absolute value, of ±HUGE can be considered as being the floating point value that is as large as possible but smaller than the magnitude of ±OV;

(ii) the magnitude of ±∞ can be considered as being the floating point value that is as small as possible but larger than the magnitude of OV;

(iii) the magnitude of ±0 can be considered as being the floating point value that is as large as possible but smaller than the magnitude of ±UN; and (iv) the magnitude of ±TINY can be considered as being the floating point value that is as small as possible but larger than the magnitude of ±UN. For purposes of clarity and to avoid any potential confusion, these names for such finite non-zero numbers will be used in the following description.

In an embodiment of the invention, an arrangement is generally provided to force floating point status information, as represented by the embedded flags, associated with a floating point operand to predetermined or selected values. In other words, circuit 10 operates to selectively force or clear particular status information from a resulting operand in order to enhance overall floating point processing.

In the illustrated embodiment in FIG. 1, the exemplary floating point status information forcing circuit 10 receives one operand, one or more control signals (such as control signals "a" through "e") and one or more signals representative of the rounding mode. Upon receiving the operand, forcing circuit 10 responsively generates a result in which the floating point status information associated with the result is cleared or forced to selected or predetermined values based upon the values of the control signals and rounding mode signals. The control signals "a" through "e" may comprise floating point control signals provided by a control unit, as described in the related U.S. patent application Ser. No. 10/035,747, which has previously been incorporated by reference. The rounding signals may be implemented as representing conventional IEEE 754 rounding modes or other rounding modes.

More particularly with regard to the illustrated embodiment, floating point status information is indicated as being cleared if the value of a particular bit, in the case of one flag, or values of particular bits $f_{lsb+4} \ldots f_{lsb}$ in the case of multiple flags, is or are set to "zero." In the illustrated embodiment shown in FIG. 1, the exemplary floating point status information forcing circuit generates a resulting output value as follows:

(a) if control signal "a" is asserted, and the operand is in the exemplary NaN format 66, then the result is a copy of the operand with all of the five least-significant bits $f_{lsb+4} \ldots f_{lsb}$ of the fraction field, which comprise the floating point status information, set to the value "zero," thereby clearing the floating point status information;

(b) if control signal "b" is asserted, and the operand is in the exemplary infinity format 65, then the result is a copy of the operand with the five least-significant bits $f_{lsb+4} \ldots f_{lsb}$ of the fraction field, which comprise the floating point status information, set to the value "zero," thereby clearing the floating point status information;

(c) if control signal "c" is asserted, and the operand is in the exemplary overflow format 64, then the result is:

| OPERAND | ROUNDING MODE | RESULT |
|---|---|---|
| +OV | toward nearest | +Inf |
| +OV | toward zero | +HUGE |
| +OV | toward plus infinity | +Inf |
| +OV | toward minus infinity | +HUGE |
| −OV | toward nearest | −Inf |
| −OV | toward zero | −HUGE |
| −OV | toward plus infinity | −HUGE |
| −OV | toward minus infinity | −Inf |

where, +Inf represents a value in the exemplary infinity format 65 with the sign bit clear and all flags clear, and −Inf represents a value in the exemplary infinity format 65 with the sign bit set and all flags clear;

(d) if control signal "d" is asserted, and the operand is in the exemplary underflow format 61, then the result is:

| OPERAND | ROUNDING MODE | RESULT |
|---|---|---|
| +UN | toward nearest | +0 |
| +UN | toward zero | +0 |
| +UN | toward plus infinity | +TINY |
| +UN | toward minus infinity | +0 |
| −UN | toward nearest | −0 |
| −UN | toward zero | −0 |
| −UN | toward plus infinity | −0 |
| −UN | toward minus infinity | −TINY |

(e) If control signal "e" is asserted, and the operand is a finite non-zero value that is not in the exemplary underflow format 61 or overflow format 64, then the result is:

(i) If the least-significant bit $f_{lsb}$ of the fraction field of the operand has the value "zero," the result is equal to the operand; but (ii) If the least-significant bit $f_{lsb}$ of the fraction field of the operand has the value "one," then the result is generated as follows: Let X be the floating point value whose sign is the same as that of the operand and whose magnitude, or absolute value, is as large as possible but smaller than the magnitude of the operand. Let Y be the floating point value whose sign is the same as that of the operand and whose magnitude is as small as possible but larger than the magnitude of the operand. Those skilled in the art will appreciate that X and Y will each be a finite non-zero floating point value with the least-significant bit of the fraction field $f_{lsb}$ having the value of zero. Then the result is as follows:

| OPERAND SIGN | $f_{lsb+1}$ | ROUNDING MODE | RESULT |
|---|---|---|---|
| + | 0 | toward nearest | X |
| + | 1 | toward nearest | Y |
| + | x | toward zero | X |
| + | x | toward plus infinity | Y |
| + | x | toward minus infinity | X |
| − | 0 | toward nearest | X |
| − | 1 | toward nearest | Y |
| − | x | toward zero | X |
| − | x | toward plus infinity | X |
| − | x | toward minus infinity | Y |

where, the column for $f_{lsb+1}$, represents the value of the second least-significant bit of the fraction field of the operand, and "x" means "don't care."

(f) Otherwise, if none of items (a) through (e) applies, then the result corresponds to the operand.

It will be appreciated that, for items (c) and (d) above, values in the exemplary underflow format 61 and overflow format 64 are considered inexact, as reflected by the fact that the least-significant bits $f_{lsb}$ of their fraction fields have the value "one." Accordingly, the floating point status information forcing circuit 10, when it generates the result, will provide an exact value that is proximate to the value represented by the operand, as determined by the rounding mode. Similarly, for items (e)(ii), since the least-significant bit $f_{lsb}$ of the operand's fraction field has the value "one," the operand is inexact, and so the floating point status information forcing circuit 10, when it generates the result, will provide an exact value that is proximate to the value represented by the operand, as determined by the rounding mode. In both cases, since the result is exact, the least-significant bit $f_{lsb}$ of the fraction field of the result will have the value "zero," effectively representing a clear inexact flag "x." For item (e)(i), since the least-significant bit $f_{lsb}$ of the operand's fraction field has the value "zero," the operand is exact with the "zero" value representing a cleared inexact flag "x."

In addition, for items (c), (d), and (e)(ii), it will be appreciated that for the "round to nearest" rounding mode, if the second least-significant bit $f_{lsb+1}$ of the fraction field of the operand has the value "zero," the magnitude of the result will correspond to the magnitude of the floating point value that is as large as possible but smaller than the magnitude of the operand. On the other hand, if the second least-significant bit $f_{lsb+1}$ of the fraction field of the operand has the value "one," the magnitude of the result will correspond to the magnitude of the floating point value that is as small as possible but larger than the magnitude of the operand.

With this background, the structure and operation of the exemplary floating point status information forcing circuit 10 will be more specifically described in connection with FIG. 1. With reference to FIG. 1, the exemplary floating point status information forcing circuit 10 comprises an operand buffer 11, an operand analysis circuit 12, a decision circuit 13, a result assembler 14 and an incrementation circuit 15. The operand buffer 11 receives and stores an operand from, for example, a set of registers (not shown) in a conventional manner. The operand analysis circuit 12 analyzes the operand in the operand buffer 11 and generates signals providing information relating to the respective operands, which are provided to the decision circuit 13. The signals provided by the operand analysis circuit 12 essentially provide information as to the bit pattern of the fraction field of the operand, which is used by the decision circuit in determining the format 60–66 of the operand. The decision circuit 13 receives the signals from the operand analysis circuit 12, the control signals (a) through (e), and signals representative of the rounding mode, and generates control signals that control the result assembler 14 in assembling the result. The result assembler 14 receives information from the operand buffer 11 and incrementation circuit 15 and, under control of control signals from the decision circuit 13, assembles the result, which is coupled onto a result bus 17. The result bus 17, in turn, may deliver the result to any convenient destination, such as a register in a register set (not shown), for storage or other use.

As noted above, operand analysis circuit 12 analyzes the operand in the operand buffer 11 and generates signals providing information relating to the fraction field of the operand. In the illustrated embodiment, operand analysis circuit 12 comprises a number of comparators, including:

(i) a comparator 20 that generates an asserted signal if the bits $e_{msb} \ldots e_{lsb}$ of the exponent field of the operand in buffer 11 are all binary ones, which may be the case if the operand is in the exemplary infinity format 65 or the NaN format 66;

(ii) a comparator 21 that generates an asserted signal if the bits $e_{msb} \ldots e_{lsb+1}$ of the exponent field of the operand in the buffer 11 are all binary ones, and the bit $e_{lsb}$ is a binary zero, which may be the case if the operand is in the exemplary overflow format 64;

(iii) a comparator 22 that generates an asserted signal if the bit $e_{msb} \ldots e_{lsb}$ of the exponent field of the operand in buffer 11 are all binary zeros, which may be the case if the operand is in the exemplary zero format 60, underflow format 61, or denormalized format 62;

(iv) a comparator 30 that generates an asserted signal if the bits $f_{msb} \ldots f_{lsb+5}$ of the fraction field of the operand in the buffer 11 are all binary ones, which may be the case if the operand is in one of the exemplary formats, such as the denormalized format 62, normalized non-zero format 63, overflow format 64, or NaN format 66;

(v) a comparator 31 that generates an asserted signal if the bits $f_{msb} \ldots f_{lsb+5}$ of the fraction field of the operand in the buffer 11 are all binary zeros, which may be the case if the operand is in one of the exemplary formats, such as the zero format 60, underflow format 62, normalized non-zero format 63, or infinity format 65;

(vi) a comparator 32 that generates an asserted signal if the bits of the fraction field $f_{lsb+4} \ldots f_{lsb}$ of the operand in the buffer 11 are all binary ones, which may be the case if the operand is in the denormalized format 62 or normalized non-zero format 63, and which will be the case if the operand is in the exemplary overflow format 64, or if all of the flags "n," "o," "u," "z," and "x" are set in the exemplary infinity format 65 or NaN format 66;

(vii) a comparator 33 that generates an asserted signal if the bits $f_{lsb+4} \ldots f_{lsb+1}$ of the fraction field of the operand in the buffer 11 are all binary zeros, and if the bit $f_{lsb}$ of the fraction field is a binary "one," which will be the case if the operand is in the exemplary underflow format 61, and which may be the case if the operand is in the exemplary denormalized format 62, the exemplary normalized non-zero format 63, or if the flags "n," "o," "u," and "z" are clear and the flag "x" is set in the exemplary infinity format 65 or NaN format 66; and Exemplary operand analysis circuit 12 also includes combinatorial logic elements that receive selected signals from the comparators and generates asserted signals to provide indications as to certain characteristics of the respective operand, including:

(viii) an AND gate 38 that generates an asserted signal if the comparators 31 and 33 are both generating asserted signals, which may be the case if the bits $f_{msb} \ldots f_{lsb}$ of the fraction field of the operand in the operand buffer 11 have the bit pattern 00000000000000000000001; and (ix) an AND gate 37 that generates an asserted signal if the comparators 30 and 32 are both generating asserted signals, which may be the case if the bits $f_{msb} \ldots f_{lsb}$ of the fraction field of the operand in the operand buffer 11 have the bit pattern 11111111111111111111111.

As noted above, the decision circuit 13 receives the signals from the operand analysis circuit 12, the control signals (a) through (e), and signals representative of the rounding mode, and generates assembly control signals that control the result assembler 14 when assembling the result. In the illustrated embodiment, the exemplary decision circuit 13 comprises:

(x) a NAND gate 40 that generates an asserted signal if control signal "a" is asserted, the comparator 20 is generating an asserted signal, and comparator 31 is generating a negated signal (it will be appreciated that NAND gate 40 may generate an asserted signal if the operand in operand buffer 11 is in the exemplary NaN format 66 and control signal "a" is asserted (reference item (a) above));

(xi) an AND gate 41 that generates an asserted signal if control signal "b" is asserted, and the comparators 20 and 31 are generating asserted signals (it will be appreciated that NAND gate 40 may generate an asserted signal if the operand in operand buffer 11 is in the exemplary infinity format 65 and control signal "b" is asserted (reference item (b) above));

(xii) an OR gate 49 that generates an asserted signal if either NAND gate 40 or AND gate 41 is generating an asserted signal (it will be appreciated that OR gate 49 may generate an asserted signal if the operand in operand buffer 11 is in the exemplary NaN format 66 and control signal "a" is asserted or if in the exemplary infinity format 65 and control signal "b" is asserted (reference items (a) and (b) above));

(xiii) an AND gate 42 that generates an asserted signal if comparator 21 and AND gate 37 are generating asserted signals, and the control signal "c" is asserted (it will be appreciated that AND gate 42 may generate an asserted signal if the operand in operand buffer 11 is in the overflow format 64 and control signal "c" is asserted (reference item (c) above));

(xiv) an AND gate 43 that generates an asserted signal if comparator 22 and AND gate 38 are generating asserted signals, and control signal "d" is asserted (it will be appreciated that AND gate 43 may generate an asserted signal if the operand in operand buffer 11 is in the exemplary underflow format 61 and control signal "d" is asserted (reference item (d) above));

(xv) a NAND gate 44 that generates an asserted signal if comparator 22 is generating an asserted signal and AND gate 36 is generating a negated signal (it will be appreciated that NAND gate 44 may generate an asserted signal if the operand in operand buffer 11 is in the exemplary zero format 60 or denormalized format 62);

(xvi) a NAND gate 45 that generates an asserted signal if comparators 20, 21, and 22 are all generating negated signals (it will be appreciated that NAND gate 45 may generate an asserted signal if the operand in operand buffer 11 is in the exemplary normalized non-zero format 63);

(xvii) a NAND gate 46 that generates an asserted signal if comparator 21 is generating an asserted signal and AND gate 37 is generating a negated signal (it will be appreciated that NAND gate 45 may generate an asserted signal if the operand in operand buffer 11 is in the exemplary normalized non-zero format 63);

(xviii) an OR gate 47 that generates an asserted signal if any of NAND gates 44 through 46 are generating asserted signals (it will be appreciated that OR gate 47 may generate an asserted signal if the operand in operand buffer 11 is in one of the exemplary formats, such as the zero format 60, the denormalized format 62, or the normalized non-zero format 63);

(xix) an AND gate 48 that generates an asserted signal if OR gate 47 is generating an asserted signal and control signal "e" is asserted (it will be appreciated that AND gate 48 may generate an asserted signal if the operand in operand buffer 11 is in one of the exemplary formats, such as the zero format 60, the denormalized format 62 or the normalized non-zero format 63, and control signal "e" is asserted (reference item (e) above));

(xx) an OR gate 50 that generates an asserted signal if any of AND gates 42, 43, or 48 are generating asserted signals; and (xxi) an OR gate 51 that generates an asserted signal if either OR gate 49 or OR gate 50 is generating an asserted signal.

Generally, as noted above, if the operand in operand buffer 11 is in the exemplary NaN format 66 and control signal "a" is asserted, or in the exemplary infinity format 65 and control signal "b" is asserted, the result corresponds to the operand in the operand buffer 11 with the five least-significant bits $f_{lsb+4} \ldots f_{lsb}$ of the fraction field, which comprise the floating point status information, set to the value "zero," thereby clearing the floating point status information. As noted above, OR gate 49 generates an asserted signal if the operand in operand buffer 11 is in the exemplary NaN format 66 and control signal "a" is asserted, or in the exemplary infinity format 65 and control signal "b" is asserted. As will be described below, if the OR gate 49 is generating an asserted signal, the result assembler 14 may couple signals representative of the sign bit, exponent field, and most-significant bits $f_{msb} \ldots f_{lsb+5}$ of the fraction field of the operand in operand buffer 11 to the result bus 17 to represent corresponding bits of the result. In addition, the result assembler 14 may couple negated signals to the result bus 17 to represent bits $f_{lsb+4} \ldots f_{lsb}$ of the fraction field of the result. Specifically, the signal from OR gate 49 directly controls the signal representative of bits $f_{lsb+4} \ldots f_{lsb+1}$ of the result, and through OR gate 51 controls the signal representative of bit $f_{lsb}$ of the result. When the signal from OR gate 49 is asserted, the signals representative of bits $f_{lsb+4} \ldots f_{lsb}$ are negated.

On the other hand, if the operand in operand buffer 11 is in the exemplary overflow format 64 and control signal "c" is asserted, or in the exemplary underflow format 61 and control signal "d" is asserted, or is an inexact value in one of the exemplary formats, such as the zero format 60, the denormalized format 62, or normalized non-zero format 63, and control signal "e" is asserted, except for the least-significant bit $f_{lsb}$ of the fraction field, the result will depend on the rounding mode. As noted above, OR gate 50 generates an asserted signal in all three cases. In all three cases, the least-significant bit $f_{lsb}$ of the fraction field of the result will have the value "zero" and the result assembler 14 will provide a negated signal representative thereof to the result bus 17. Depending on the rounding mode, except for the sign bit and the least-significant bit $f_{lsb}$ of the fraction field, the remaining bits of the result, which represent the exponent field and the most-significant bits $f_{msb} \ldots f_{lsb+1}$ of the fraction field, may correspond to either:

(i) the corresponding bits of the operand in operand buffer 11, i.e., bits $e_{msb} \ldots e_{lsb}$ $f_{msb} \ldots f_{lsb+1}$ of the operand in operand buffer 11, or (ii) to the corresponding bits $e_{msb} \ldots e_{lsb}$ $f_{msb} \ldots f_{lsb+1}$ of the operand in the operand buffer 11, considered as an integer, incremented by the value "one."

For example, as noted above in connection with item (c), if control signal "c" is asserted, and the operand is +OV (a positive value in the exemplary overflow format 64), then the result is +Inf (i.e., a value in the exemplary infinity format 65 with the sign bit clear, which has the bit pattern 0 11111111 00000000000000000000000) if the rounding mode is "toward plus infinity" and +HUGE (i.e., a value having the bit pattern 0 11111110 11111111111111111111110) if the rounding mode is "toward minus infinity." It will be appreciated that the operand +OV has the bit pattern 0 11111110 11111111111111111111111, with leading "0" being the sign bit, the next eight bits 11111110 comprising bits $e_{msb} \ldots e_{lsb}$ of the exponent field, and the final twenty-three bits 11111111111111111111111 comprising bits $f_{msb} \ldots f_{lsb}$ of the fraction field. In that case, if the rounding mode is "toward minus infinity," the result will correspond to the bits $e_{msb} \ldots e_{lsb}$ $f_{msb} \ldots f_{lsb+1}$ of the operand in the operand buffer 11 (reference item (i) directly above). On the other hand, if the rounding mode is "toward plus infinity," the result will correspond to the bits $e_{msb} \ldots e_{lsb}$ $f_{msb} \ldots f_{lsb+1}$ of the operand in the operand buffer 11, considered as an integer, incremented by the value "one" (reference item (ii) directly above). In both cases, the sign bit of the result will have the value "zero" to indicate that the result is positive and the least-significant bit $f_{lsb}$ of the result will have the value "zero," which also serves to provide a clear inexact flag "x." An examination of bit patterns of results for other rounding modes and operand values will reveal that the results may be generated as described directly above in connection with items (i) and (ii). The incrementation circuit 15 is used to provide the value referenced in item (ii) above.

In the illustrated embodiment, the exemplary result assembler 14 includes a multiplexer 58, a multiplexer control circuit 59, and a plurality of NAND gates 57(0) through 57(4) (generally identified by reference numeral 57(i)). Each NAND gate 57(i) receives a signal corresponding to one of the least-significant bits $f_{lsb+i}$ of the fraction field, and controls the coupling of the signal. In the case of NAND gate 57(0), the signal provided by the NAND gate is coupled to the result bus 17 as the least-significant bit $f_{lsb}$ of the fraction field of the result. In the case of the other NAND gates 57(1) through 57(4), the signals provided by the NAND gates are coupled to respective inputs of the multiplexer 58. As will be described below in greater detail, the multiplexer 58 receives, at one input terminal, signals from the operand buffer 11 representing bits $e_{msb} \ldots e_{lsb}\ f_{msb} \ldots f_{lsb+5}$ of the exponent and fraction fields of the operand and signals from the NAND gates 57(1) through 57(4), and at the other input terminal, signals from the incrementation circuit 15. The multiplexer control circuit 59 generates a multiplexer control signal that controls the multiplexer 58, specifically determining the terminal whose signals are coupled to the result bus 17 representative of bits $e_{msb} \ldots e_{lsb}\ f_{msb} \ldots f_{lsb+1}$ of the exponent and fraction fields of the result. In all cases, a signal representative of the sign bit of the operand in operand buffer 11 is coupled to the result bus 17 to represent the sign bit of the result.

More specifically, the NAND gate 57(0) is controlled by the signal generated by the OR gate 51 and NAND gates 57(1) through 57(4) are controlled by the signal generated by the OR gate 49. Accordingly, if the operand in operand buffer 11 is in the exemplary NaN format 66 or infinity format 65 and the respective "a" or "b" control signal is asserted (reference items (a) and (b) above), the OR gate 49 will generate an asserted signal, which, in turn, disables the NAND gates 57(1) through 57(4). In addition, OR gate 51 will generate an asserted signal, which, in turn, disables the NAND gate 57(0). Each disabled NAND gate 57(i), in turn, blocks the signals from the operand buffer 11 representing bits $f_{lsb+i}$ of the fraction field of the operand, and provides a signal therefore representing the value "zero" to the result bus 17, thereby providing cleared flags "n," "o," "u," "z," and "x" in the result.

On the other hand, if the operand in operand buffer 11 is in one of the exemplary formats, such as the overflow format 64, underflow format 61, denormalized format 62, or normalized non-zero format 63, and the respective "c," "d," or "e" control signal is asserted (reference items (c), (d), and (e) above), the OR gate 51 will generate an asserted signal, which, in turn, disables the NAND gate 57(0). In this case, however, OR gate 49 will generate a negated signal, which, in turn, enables the NAND gates 57(1) through 57(4). Disabled NAND gate 57(0), in turn, blocks the signal from the operand buffer 11 representing bits $f_{lsb}$ of the fraction field of the operand, and provides a signal therefore representing the value "zero" to the result bus 17, effectively representing a clear inexact flag. On the other hand, NAND gates 57(1) through 57(4), enabled by the negated signal generated by OR gate 49, will couple signals representative of the bits $f_{lsb+4} \ldots f_{lsb+1}$ of the operand in operand buffer 11 to the multiplexer 58.

Finally, if all of the control signals "a" through "e," are negated, or if a control signal is asserted but the operand is not in the format indicated in connection with items (a) through (e) above, both OR gates 49 and 51 will generate negated signals. In that case, all NAND gates 57(0) through 57(4), will be enabled to couple signals representative of the bits $f_{lsb+4} \ldots f_{lsb}$ of the operand in operand buffer 11 to the result bus 17, in the case of NAND gate 57(0), or to the multiplexer 58, in the case of NAND gates 57(1) through 57(4).

As noted above, the multiplexer 58 selectively couples signals from the operand buffer 11 representative of bits $e_{msb} \ldots e_{lsb}\ f_{msb} \ldots f_{lsb+5}$, signals from the NAND gates 57(1) through 57(4) received at one input terminal, or signals from the incrementation circuit 15 received at the other input terminal, to the result bus 17 under control of a multiplexer control signal from the multiplexer control circuit 59. The signals provided by the multiplexer 58 represent bits $e_{msb} \ldots e_{lsb}\ f_{msb} \ldots f_{lsb+1}$ of the exponent and fraction fields of the result. If the multiplexer control signal provided by the multiplexer control circuit 15 is negated, the multiplexer 58 will couple signals from the incrementation circuit 15 to the result bus 17. On the other hand, if the multiplexer control signal is asserted, the multiplexer 58 will couple signals from the operand buffer 11 representative of bits $e_{msb} \ldots e_{lsb}\ f_{msb} \ldots f_{lsb+5}$ and signals from the NAND gates 57(1) through 57(4) to the result bus 17.

The multiplexer control circuit 59 operates under control of the signal generated by OR gate 50, signals representative of the rounding mode, the sign bit, and bits $f_{lsb+1}$ and $f_{lsb}$ of the fraction field of the operand in operand buffer 11. Generally, if the signal generated by OR gate 50 is negated, which may be the case if the operand in operand buffer 11 is in the exemplary NaN format 66 or infinity format 65 and the respective "a" or "b" control signal is asserted (reference items (a) and (b) above), or if all of the control signals "a" through "e" are negated, or if a control signal is asserted but the operand is not in the format indicated in connection with items (a) through (e) above, the multiplexer control circuit 59 will generate an asserted signal regardless of the conditions of the signals representative of the rounding mode and signals representative of the sign bit and bits $f_{lsb+1}$ and $f_{lsb}$ of the fraction field of the operand in operand buffer 11.

On the other hand, if the signal generated by OR gate 50 is asserted, which will be the case if the operand in operand buffer 11 is in one of the exemplary formats, such as the overflow format 64, underflow format 61, zero format 60, denormalized format 62, or normalized non-zero format 63, and the respective "c," "d," or "e" control signal is asserted (reference items (c), (d), and (e) above), whether the multiplexer control signal is asserted or negated will depend on the conditions of the signals representative of the rounding mode and signals representative of the sign bit and bits $f_{lsb+1}$ and $f_{lsb}$ of the fraction field of the operand in operand buffer 11. In one embodiment, the rounding mode is specified by rounding mode signals R(0) and R(1) as follows:

| R(1) | R(0) | Rounding Mode |
|---|---|---|
| 0 | 0 | round to nearest |
| 0 | 1 | round toward zero |
| 1 | 0 | round toward plus infinity |
| 1 | 1 | round toward minus infinity |

Thus, if the signal generated by the OR gate 50 is asserted, the multiplexer control circuit 59 will generate a negated multiplexer control signal, enabling the multiplexer 58 to couple signals from the incrementation circuit 15 to the result bus 17, if:

(i) a signal representative of the least-significant bit $f_{lsb}$ of the fraction field of the operand in operand buffer 11 is asserted, which may be the case if the least-significant bit has the value "one;" and (ii) an OR gate 55 is generating an asserted signal, which may be the case if:

(a) a NAND gate 53 is generating an asserted signal, which may be the case if the R(1) rounding mode signal is asserted and the R(0) rounding mode signal has the same asserted or negated condition as the signal representative of the sign of the sign bit of the operand in operand buffer 11 (XOR gate 52 executes the comparison between the sign bit of the operand in operand buffer 11 and the rounding mode signal R(0)), or (b) a NAND gate 54 is generating an asserted signal, which may be the case if both the R(0) and R(1) rounding mode signals are negated and a signal representative of the bit $f_{lsb+1}$ is asserted, which will be the case if the rounding mode is "round to nearest" and the bit $f_{lsb+1}$ has the value "one."

It will be appreciated that the NAND gate 53 may generate an asserted signal (reference item (ii)(a) directly above) if:

(a) the operand in operand buffer 11 is positive and the rounding mode is "round toward plus infinity;" or (b) the operand in operand buffer 11 is negative and the rounding mode is "round toward minus infinity."

In both cases, the negated multiplexer control signal will enable the multiplexer 58 to couple the signals provided by incrementation circuit 15 to the result bus 17 as the bits $e_{msb} \ldots e_{lsb}\, f_{msb} \ldots f_{lsb+1}$ of the exponent and fraction fields of the result. It will be appreciated that, if the operand in the operand buffer 11 is positive, the increased magnitude represented by the signals provided by incrementation circuit 15 will provide an increased result, (i.e., rounded toward plus infinity) as required by the rounding mode. On the other hand, if the operand is negative, the increased magnitude will provide a decreased result (i.e., rounded toward minus infinity), as required by the rounding mode.

On the other hand, the NAND gate 54 accommodates the "round to nearest" rounding mode for items (c), (d), and (e)(ii) above. As noted above, for items (c), (d), and (e)(ii) and for the "round to nearest" rounding mode, if the second least-significant bit $f_{lsb+1}$ of the fraction field of the operand has the value "zero," the magnitude of the result will correspond to the magnitude of the floating point value that is as large as possible but smaller than the magnitude of the operand, and the magnitude of the result may be represented by the signals received by the multiplexer 58 from the operand buffer 11 and NAND gates 57(1) through 57(4). On the other hand, if the second least-significant bit $f_{lsb+1}$ of the fraction field of the operand has the value "one," the magnitude of the result will correspond to the magnitude of the floating point value that is as large as possible but smaller than the magnitude of the operand, and the magnitude of the result may be represented by the signals received by the multiplexer 58 from the incrementation circuit 15. Accordingly, if the rounding mode signals indicate that the rounding mode is the "round to nearest" rounding mode, and if the signal representative of bit $f_{lsb+1}$ of the fraction field of the operand indicates that the bit has the value "one," the NAND gate 54 is asserted to, in turn, enable the multiplexer control circuit 59 to provide a negated signal that, in turn, enables the multiplexer 58 to couple the signals from incrementation circuit 15 to the result bus 17.

It will be appreciated that, otherwise, the multiplexer control circuit 59 will generate an asserted signal to enable the multiplexer 58 to couple signals representative of bits $e_{msb} \ldots e_{lsb}\, f_{msb} \ldots f_{lsb+5}$ of the exponent and fraction fields of the operand in operand buffer 11, along with signals from NAND gates 57(1) through 57(4) to the result bus 17. It will be appreciated that this will occur:

(i) in connection with items (c), (d), and (e)(ii), for the "round to nearest" rounding mode, if the second least-significant bit $f_{lsb+1}$ of the fraction field of the operand has the value "zero;"

(ii) in connection with items (c), (d), and (e)(ii), in connection with the "round to zero" rounding mode;

(iii) in connection with items (e)(i), if the operand is in the exemplary denormalized format 62 or the normalized non-zero format 63, and if the operand is exact, which may be indicated if the signal provided by operand buffer 11 to NAND gate 57(0), which is representative of the least-significant bit $f_{lsb}$ of the fraction field of the operand, is negated; and (iv) in connection with item (f) (i.e., if none of items (a) through (e) applies).

Thus, in connection with all of these, the multiplexer 58 will couple signals representative of the bits $e_{msb} \ldots e_{lsb}\, f_{msb} \ldots f_{lsb+5}$ from the exponent and fraction fields of the operand in operand buffer 11, along with the signals from the NAND gates 57(4) through 57(1) to the result bus 17, as signals representative of the $e_{msb} \ldots e_{lsb}\, f_{msb} \ldots f_{lsb+1}$ for the exponent and fraction fields of the result.

One of ordinary skill in the art will recognize that other formats and bit patterns could be used to represent the floating point operand formats without departing from the principles of the present invention. One of ordinary skill in the art will also recognize that the floating point status information contained in the operands could easily be represented by other bit combinations (not shown) without departing from the principles of the present invention. For example, more or fewer bits could be used, a subset or superset of the exemplary status bits could be used, or the most significant bits of an operand (or some other subset of bits) could be used to indicate the floating point status information, instead of the least significant bits illustrated.

It will be appreciated that a system in accordance with an embodiment of the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided into the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

It will also be appreciated that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A floating point flag forcing circuit for selectively clearing at least a portion of encoded status flag information within a floating point operand, comprising:

a first circuit that determines a predetermined format associated with the floating point operand from the encoded status flag information within the floating point operand; and a second circuit that assembles a resulting operand in which at least a portion of the encoded status flag information of the resulting operand is cleared based upon the predetermined format and an assembly signal generated by the first circuit.

2. The floating point flag forcing circuit of claim 1, wherein the first circuit comprises:

an analysis circuit that analyzes the floating point operand and generates an intermediate indication of a bit pattern associated with the floating point operand; and a decision circuit that receives the intermediate indication from the analysis circuit to determine the predetermined format associated with the floating point operand, the decision circuit also being capable of generating the assembly signal, which is provided to the second circuit.

3. The floating point flag forcing circuit of claim 1, wherein the second circuit assembles the resulting operand by selectively forcing the at least a portion of the encoded status flag information of the resulting operand to a selected value in accordance with a rounding mode signal and the assembly signal.

4. The floating point flag forcing circuit of claim 3, wherein the selected value is based upon the predetermined format of the floating point operand, the control signal, and the rounding mode signal.

5. The floating point flag forcing circuit of claim 1, wherein the encoded status flag information represents an invalid operation flag, an overflow flag, an underflow flag, an inexact flag, and a division by zero operation flag.

6. The floating point flag forcing circuit of claim 1, wherein the predetermined format represent a zero format, an overflow format, an underflow format, a denormalized format, a normalized non-zero format, an infinity format, and a not-a-number (NaN) format.

7. The floating point flag forcing circuit of claim 6, wherein an overflow format represents one of a +OV status and a −OV status.

8. The floating point flag forcing circuit of claim 6, wherein an underflow format represents one of a +UN status and a −UN status.

9. A method for forcing floating point status information for selectively clearing at least a portion of encoded status flag information within a floating point operand, comprising:

receiving the floating point operand;

analyzing the encoded status flag information associated with the floating point operand to identify a predetermined format associated with the floating point operand;

receiving a control signal for selectively clearing the encoded status flag information;

generating an assembly signal; and assembling a resulting operand in which at least a portion of the encoded status flag information of the resulting operand is cleared based upon the predetermined format and values of the control signal and the assembly signal.

10. The method of claim 9, wherein the step of analyzing further comprises:

generating an intermediate indication of a bit pattern associated with the floating point operand based upon the encoded status flag information for the floating point operand; and determining the predetermined format associated with the floating point operand based upon the intermediate indication.

11. The method of claim 9, wherein the assembling step further comprises assembling the resulting operand by selectively forcing the at least a portion of the encoded status flag information of the resulting operand to a selected value in accordance with a rounding mode signal and the assembly signal.

12. The method of claim 11, wherein the selected value is based upon the predetermined format of the floating point operand and the value of the control signal and the rounding mode signal.

13. The method of claim 9, wherein the encoded status flag information represents an invalid operation flag, an overflow flag, an underflow flag, an inexact flag, and a division by zero operation flag.

14. The method of claim 9, wherein the predetermined format represent a zero format, an overflow format, an underflow format, a denormalized format, a normalized non-zero format, an infinity format, and a not-a-number (NaN) format.

15. The method of claim 14, wherein an overflow format represents one of a +OV status and a −OV status.

16. The method of claim 14, wherein an underflow format represents one of a +UN status and a −UN status.

17. A computer-readable medium on which is stored a set of instructions for selectively clearing at least a portion of encoded status flag information within a floating point operand, which when executed perform the steps of:

receiving the floating point operand;

analyzing the encoded status flag information associated with the floating point operand to identify a predetermined format associated with the floating point operand;

receiving a control signal for selectively clearing the encoded status flag information;

generating an assembly signal; and assembling a resulting operand in which at least a portion of the encoded status flag information of the resulting operand is cleared based upon the predetermined format and values of the control signal and the assembly signal.

18. The computer readable medium of claim 17, wherein the step of analyzing further comprises:

generating an intermediate indication of a bit pattern associated with the floating point operand based upon the encoded status flag information for the floating point operand; and determining the predetermined format associated with the floating point operand based upon the intermediate indication.

19. The computer readable medium of claim 17, wherein the assembling step further comprises assembling the resulting operand by selectively forcing the at least a portion of the encoded status flag information of the resulting operand to a selected value in accordance with a rounding mode signal and the assembly signal.

20. The computer readable medium of claim 19, wherein the selected value is based upon the predetermined format of the floating point operand and the value of the control signal and the rounding mode signal.

21. The computer readable medium of claim 17, wherein the encoded status flag information represents an invalid operation flag, an overflow flag, an underflow flag, an inexact flag, and a division by zero operation flag.

22. The computer readable medium of claim 17, wherein the predetermined format represent a zero format, an overflow format, an underflow format, a denormalized format, a normalized non-zero format, an infinity format, and a not-a-number (NaN) format.

23. The computer readable medium of claim 22, wherein an overflow format represents one of a +OV status and a –OV status.

24. The computer readable medium of claim 22, wherein an underflow format represents one of a +UN status and a –UN status.

* * * * *